United States Patent [19]

Sheu

[11] Patent Number: 5,772,287
[45] Date of Patent: Jun. 30, 1998

[54] WHEEL RIM COVER

[75] Inventor: Lih-Ching Sheu, Tainan Hsien, Taiwan

[73] Assignee: Kuan Hsieng Industiral Co., Ltd., Tainan, Taiwan

[21] Appl. No.: 686,975

[22] Filed: Jul. 25, 1996

[51] Int. Cl.⁶ ........................................................ B60B 7/12
[52] U.S. Cl. ...................................... 301/37.32; 301/37.42
[58] Field of Search .............................. 301/37.1, 37.24, 301/37.31, 37.32, 37.33, 37.34, 37.35, 37.36, 37.37, 37.39, 37.42

[56] References Cited

U.S. PATENT DOCUMENTS

| | | | |
|---|---|---|---|
| 2,933,346 | 4/1960 | Lyon | 301/37.39 |
| 3,008,769 | 11/1961 | Lyon | 301/37.39 |
| 4,007,967 | 2/1977 | Buerger | 301/37.39 X |
| 4,131,322 | 12/1978 | Beisch et al. | 301/37.1 X |
| 4,344,654 | 8/1982 | Apezynski | 301/37.1 |
| 4,708,398 | 11/1987 | Loren | 301/37.39 |
| 5,277,478 | 1/1994 | Wright | 301/37.1 X |
| 5,524,972 | 6/1996 | Cailor et al. | 301/37.1 X |

*Primary Examiner*—Russell D. Stormer
*Attorney, Agent, or Firm*—Panitch Schwarze Jacobs & Nadel, P.C.

[57] ABSTRACT

The wheel rim cover invention herein utilizes a circular disc having engraved holes on the front surface and a number of clasp components on the rear surface, enabling the clasp components to be positioned adjacent to the reinforcement linings along the outer edge and rear side of the circular disc and on the mounting bases that curve slightly inward. Therefore, the clasp components can be placed within the engraved holes when stacked and the clasp components at the upper extent of the wheel rim cover can be placed inside the engraved holes at the lower extent of the wheel rim cover.

2 Claims, 6 Drawing Sheets

WHEEL RIM COVER

BACKGROUND OF THE INVENTION

1. Field of the Invention

The invention herein relates to a wheel rim cover that has a lower height when piled in stacks, which saves material during packaging and thereby lowers shipping costs.

2. Description of the Related Art

Wheel rim covers of conventional compact cars are mainly circular discs that provide external aesthetic appearance, the outer edges of which are attached to the steel rim and tires to cover the aesthetically unattractive appearance of the tire and rim, while also displaying the brand name of the automobile. Wheel rim cover manufacturers have continuously improved wheel rim covers over the years, with the improvements including installation convenience and attachment durability. As a result, most conventional wheel rim covers on the market can attain the aforesaid functional characteristics. However, in addition to installation convenience and attachment durability, wheel rim covers must also be capable of reducing shipping costs. Furthermore, most mass-produced products are conventionally shipped by freight container and, therefore, a reduction of shipping cost first involves the decreasing of the packaging material to increase freight container capacity.

Figure 1:
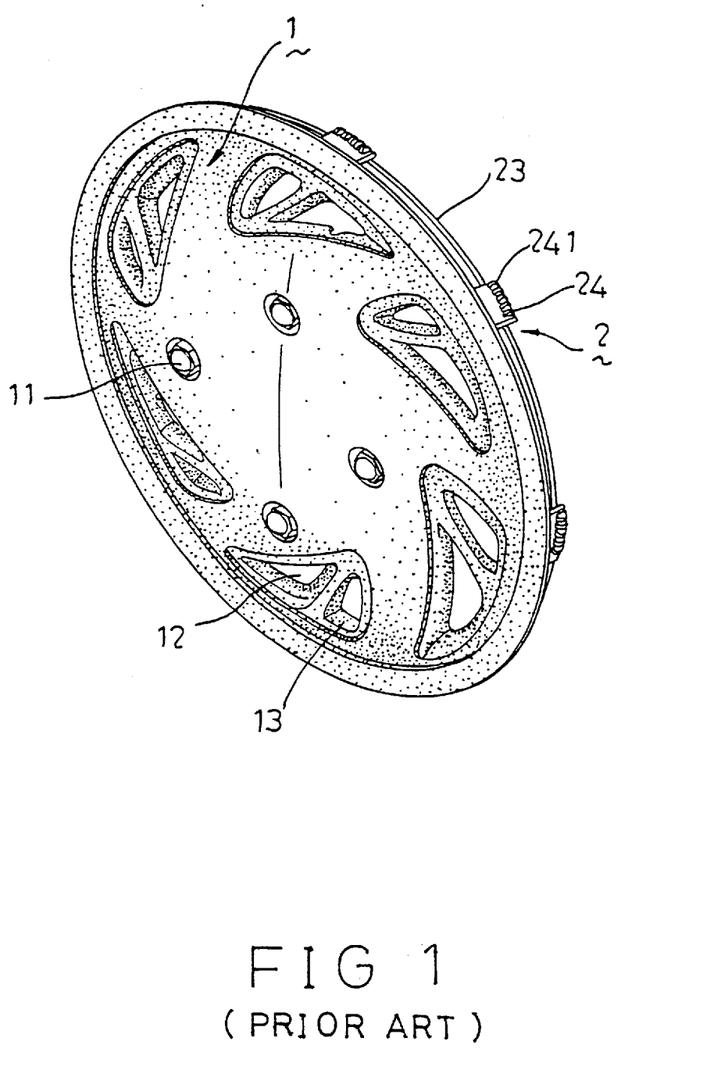
FIG. 1 is an isometric view of a prior art wheel rim cover.
Figure 2:
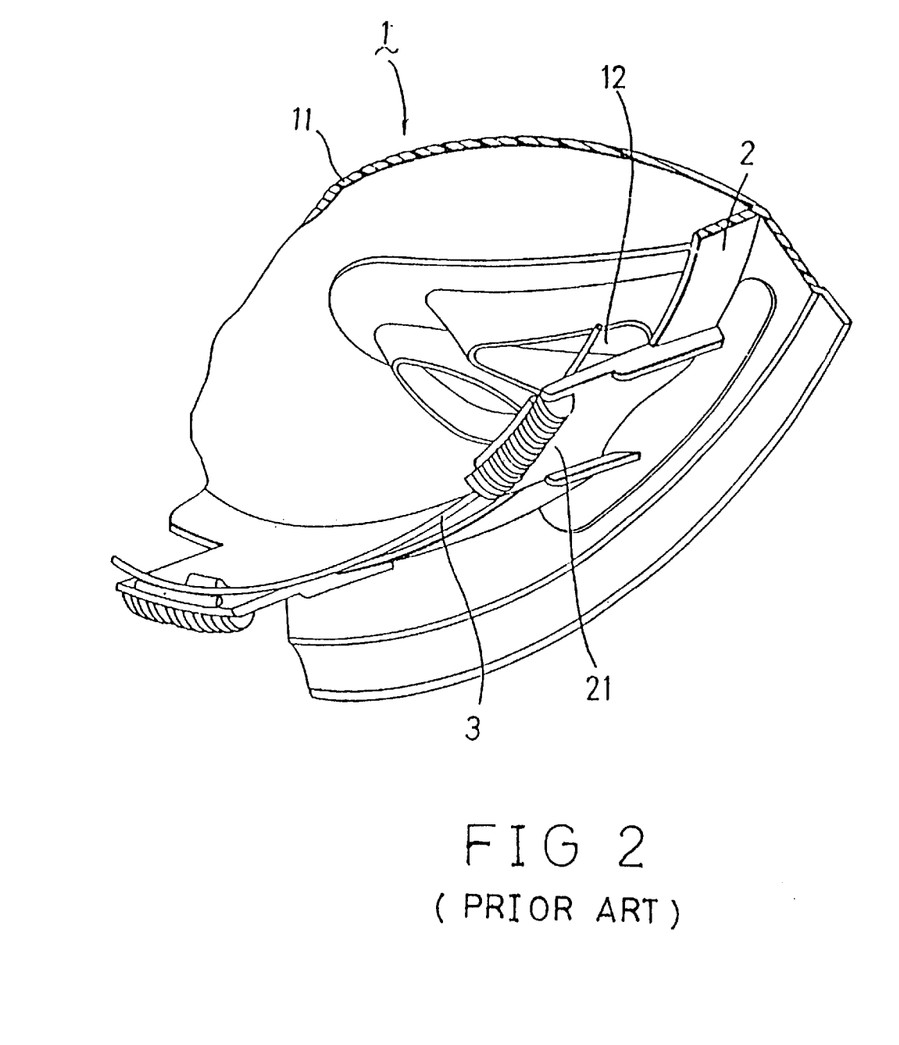
FIG. 2 is a fragmentary view of a portion of the rear surface of the prior art wheel rim cover of FIG. 1.

Conventional wheel rim covers, as indicated in FIG. 1 and FIG. 2, are mainly comprised of a circular disc (1) and clasp components (2) on the opposite side. Positioned on the outer surface of the aforesaid circular disc (1) are decorative nut caps (11) and engraved holes (12) all around. The aforesaid engraved holes (12) assist the tire to dissipate heat and, furthermore, along the opposing inner sides of the aforesaid engraved holes (12) are reinforcement linings (13), and on the opposing sides of the engraved holes (12) adjacent to the outer edge of the circular disc (3) are mounting bases (14), and on the mounting bases (14) are positioned a number of clasp components (2) situated at certain intervals apart. Formed near the inner side of the aforesaid clasp components (2) are the two protruding edges (21) and (22), and in between the protruding edges (21) and (22) is a spring coil (23), which enables the outward support of the clasp components (2) and, furthermore, positioned at the outer sides of the clasp components (2) are a number of flat projections (241) which form the clasp extensions (24).

Figure 3:
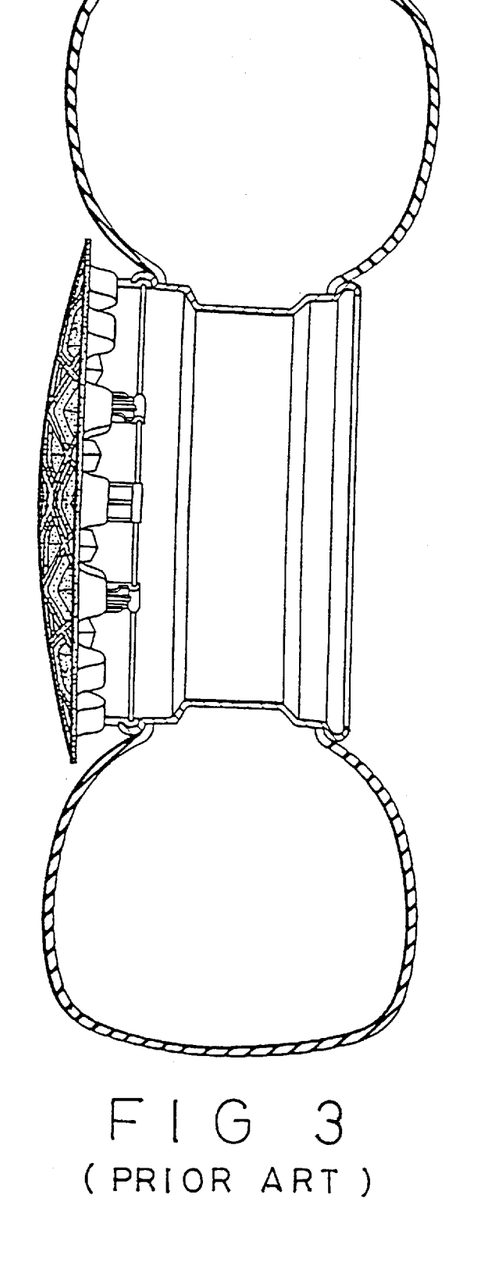
FIG. 3 is a sectional view of a rim and tire including the prior art wheel rim cover of FIG. 1.

In the structure of the aforementioned conventional wheel rim cover, since the clasp components (2) are positioned on the mounting bases (14) outside the reinforcement linings (13) at the opposing sides of the engraved holes (12), therefore, if the center point of the wheel rim cover is assumed to be the center of a circle, then the clasp components (2) are positioned at the outer edge of the engraved holes (12), therefore, as indicated in FIG. 3, when two pairs of wheel rim covers are piled in a stack, since the clasp components (2) are positioned at the outer edge of the engraved holes (12), as a result, the clasp components (2) at the upper extent of the wheel rim covers cannot be placed into the engraved holes (12) at the lower extent of the wheel rim covers, and consequently when the wheel rim covers are stacked, and the two pairs are piled consecutively in a single stack, the total height of the stack is comprised of the individual height of each wheel rim cover, with the height increasing with each added wheel rim cover, which results in larger quantities of packaging material.

SUMMARY OF THE INVENTION

The objective of the invention herein is to provide an improved wheel rim cover that includes an outer surface having the engraved holes on a circular disc and a number of clasp components positioned on the opposite side of the circular disc. Of which, the clasp components are positioned adjacent to the reinforcement linings along the outer edge of the circular disc and on the mounting bases that curve slightly inward, enabling the clasp components to be placed inside the engraved holes, such that during stacking, the clasp components at the upper extent of the wheel rim cover can be placed inside the engraved holes at the lower extent of the wheel rim cover to save the packaging material quantity and thereby reduce shipping costs.

BRIEF DESCRIPTION OF THE DRAWINGS

Additional features and advantages of the invention herein will become apparent in the following detailed description of the preferred embodiments, with reference to the accompanying drawings, wherein.

DETAILED DESCRIPTION OF THE PREFERRED EMBODIMENTS

In the detailed description of the preferred embodiments of the invention herein, similar elements are indicated by the same reference numbers throughout the disclosure.

Figure 4:
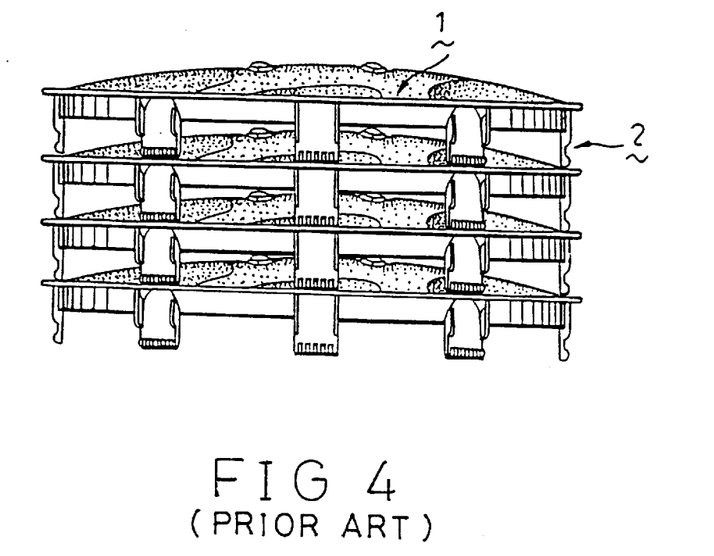
FIG. 4 is a side elevational view of four stacked prior art wheel rim covers.
Figure 5:
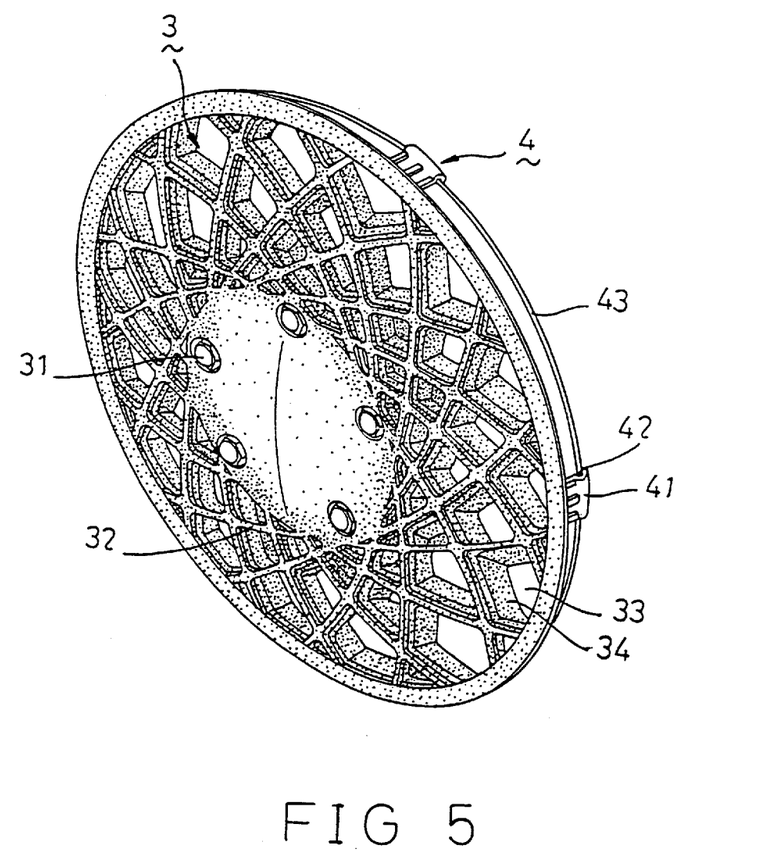
FIG. 5 is an isometric view of a wheel rim cover in accordance with a preferred embodiment of the present invention.
Figure 6:
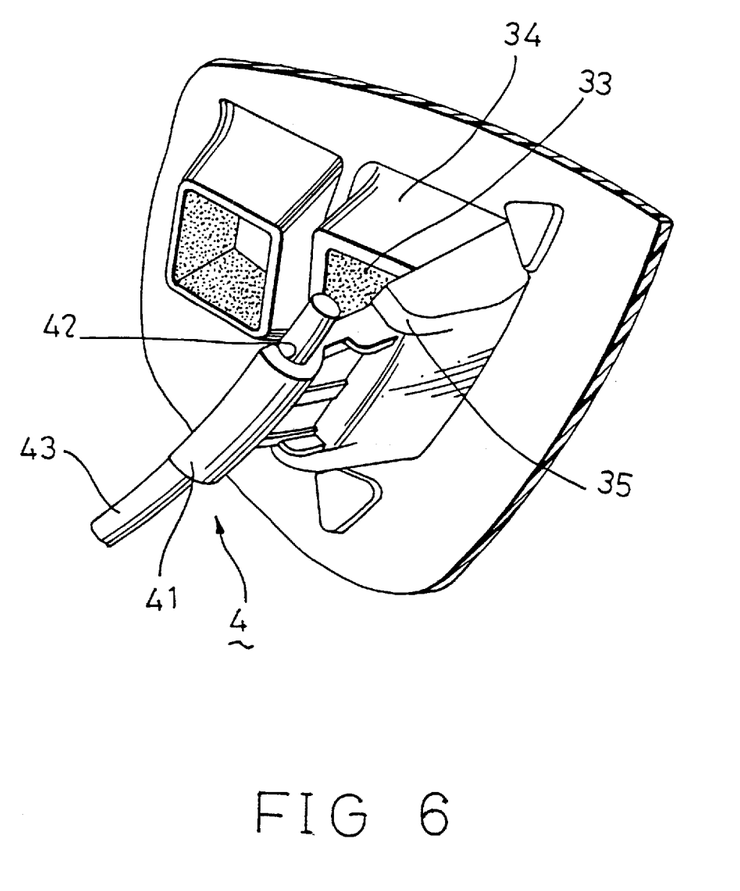
FIG. 6 is a fragmentary perspective view of a portion of the wheel rim cover of FIG. 5.

Referring to FIG. 4 and FIG. 5, the preferred embodiments of the invention herein includes a circular disc (3) and a number of clasp components (4), of which:

Positioned in the center section of the aforesaid circular disc (3) are a number of decorative nut caps (31) and an aesthetic pattern (32) covering outer periphery, the profile of which is specifically designed for aesthetic appearance and also includes through holes (33) for dissipating the heat produced by tire rotation; furthermore, along the opposing inner sides of the aforesaid through holes (33) are reinforcement linings (34), and on the opposing sides of the through holes (33) adjacent to the outer edge of the circular disc (3) are mounting bases (35) that, furthermore, are slightly curved in shape.

The aforesaid clasp component (4) projects onto the mounting bases (35) of the aforesaid circular disc (3), and the ends protrude outward and then fold hack inward to form a curved hook (41) such that the channel (42) of each curved hook (41) accommodates the insertion of a spring coil (43), which enables the outward support of the clasp components (4) and, furthermore, utilize the curved hooks (41) protruding outward from the clasp components (4) to latch onto the steel rim and tire.

Figure 7:
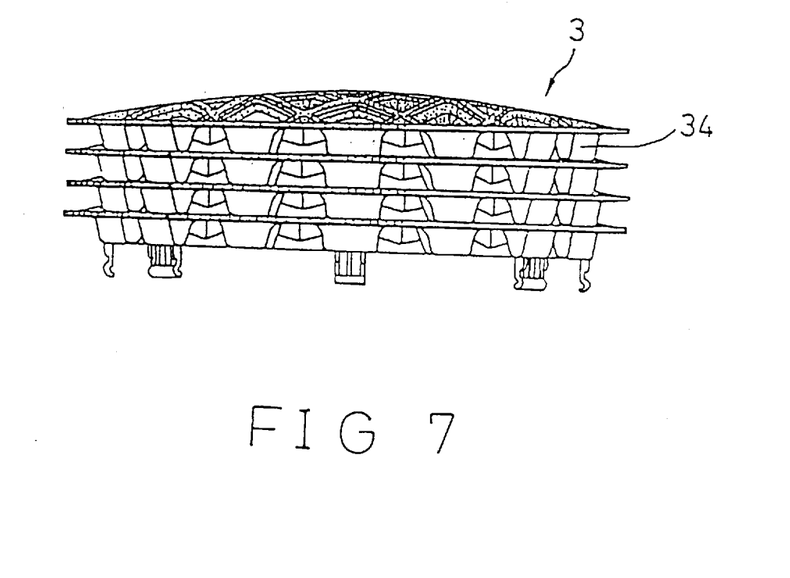
FIG. 7 is a side elevational view of four wheel rim covers as shown in FIG. 5 in a stacked relationship.
Figure 8:
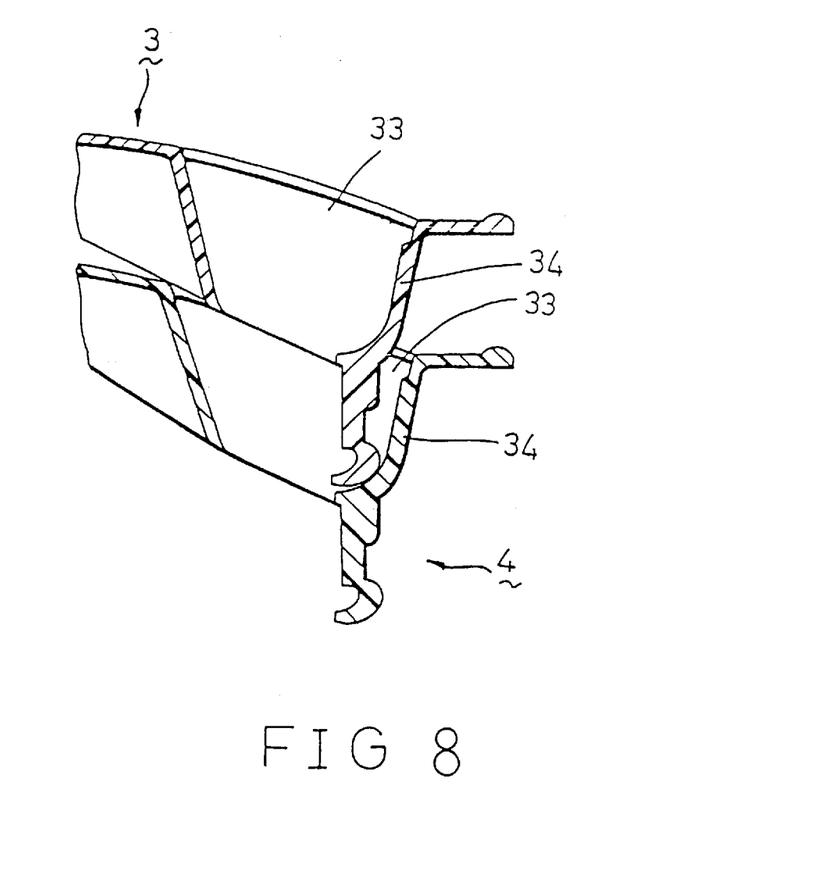
FIG. 8 is a greatly enlarged sectional view of a portion of the wheel rim cover of FIG. 5.

Since the clasp components (4) are positioned adjacent to the reinforcement linings (34) along the outer edge of the circular disc (3) and on the mounting bases (35) that curve slightly inward, therefore, and taking the center point of the wheel rim cover as the center of a circle, the inward curve of the mounting base (35) structure enables the placement of the clasp components (4) inside the through-holes (33) when stacked on the upper extent of the wheel rim cover, with the clasp components (4) inserted into the through-holes (33) at the lower extent of the wheel rim cover, which allows, when the wheel rim covers are piled into a stack, the height of the clasp components (4) to be excluded and only include the total height of the reinforcement linings (34) on the circular disc (3) of each wheel rim cover and as a result, since each vehicle has four tires when packaged and shipped, therefore, the majority of typical packaging considers a stack of four wheel rim covers as one unit, and since the clasp components (4) can be placed inside the through holes (33) during stacking, therefore, the total height of the stacked wheel rim covers is reduced, saving packaging material area and enabling the loading of even more wheel rim covers into conventional large capacity freight containers and, therefore, further decreasing shipping costs.

While the invention herein has been described in relation to what is considered the most practical and preferred embodiments, the invention herein shall not limited to the disclosed embodiments in that the intention is to cover the various interpretations included within the principles and scope of the broadest interpretations and equivalent configurations thereof.

What is claimed is:

1. A wheel rim cover comprising a circular disc having a front surface, a rear surface, an outer edge, a plurality of through holes extending separately and entirely through the disc from the front surface to the rear surface, a plurality of continuous reinforcement lining walls extending from the rear surface, each reinforcement wall surrounding each separate through hole, a plurality of mounting bases extending from the rear surface, each mounting base being positioned adjacent to a separate reinforcement lining wall and along an outer edge of the disc, and a plurality of clasps, each clasp extending from a separate mounting base and having a blunt gripping end; wherein the mounting bases and clasps extend toward the center of the disc sufficiently such that when the wheel rim cover is placed on a second, identical wheel rim cover, each of the clasps of the wheel rim cover extends through a separate through hole of the second wheel rim cover sufficiently to be encircled by the reinforcing wall surrounding the through hole on the rear side of the second wheel rim cover.

2. The wheel rim cover as recited in claim 1 further comprising a circular coil spring attached to each of the clasps, the coil spring biasing the gripping ends of the clasps outward from the center of the disc of the wheel rim cover to maintain the wheel rim cover attached to a rim of a tire when the clasps are inserted within the rim.

* * * * *

(12) EX PARTE REEXAMINATION CERTIFICATE (5155th)
United States Patent
Sheu (10) Number: US 5,772,287 C1
(45) Certificate Issued: Jul. 19, 2005

(54) WHEEL RIM COVER (75) Inventor: Lih-Ching Sheu, Tainan Hsien (TW)

(73) Assignee: Kuan Hsieng Industrial Co., Ltd., Tainan (TW)

Reexamination Request:
No. 90/006,647, May 28, 2003

Reexamination Certificate for:
Patent No.: 5,772,287
Issued: Jun. 30, 1998
Appl. No.: 08/686,975
Filed: Jul. 25, 1996

(51) Int. Cl.$^7$ .................................. B60B 7/12
(52) U.S. Cl. .................. 301/37.32; 301/37.42
(58) Field of Search .................. 301/37.102, 37.31, 301/37.32, 37.33, 37.34

(56) References Cited

FOREIGN PATENT DOCUMENTS

TW 195871 * 12/1992
TW 28738 * 8/1996

OTHER PUBLICATIONS

Taiwan Transportation Equipment Guide, Sep. 1994, all submitted.*
Jiuh Huey Enterprise Co., LTD. invoice, Aug. 12, 1994, all submitted.*

* cited by examiner

Primary Examiner—S. Joseph Morano (57) ABSTRACT

The wheel rim cover invention herein utilizes a circular disc having engraved holes on the front surface and a number of clasp components on the rear surface, enabling the clasp components to be positioned adjacent to the reinforcement linings along the outer edge and rear side of the circular disc and on the mounting bases that curve slightly inward. Therefore, the clasp components can be placed within the engraved holes when stacked and the clasp components at the upper extent of the wheel rim cover can be placed inside the engraved holes at the lower extent of the wheel rim cover.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

\* \* \* \* \*